United States Patent
Blomquist et al.

(10) Patent No.: US 6,728,445 B2
(45) Date of Patent: Apr. 27, 2004

(54) CLOSED-LOOP CONTROL OF TUNABLE OPTICAL WAVELENGTH FILTERS

(75) Inventors: Robert Blomquist, Whippany, NJ (US); George Boudoughian, Towaco, NJ (US); Louay Eldada, Lexington, MA (US); Michael J. McFarland, Washington, NJ (US); Lawrence W. Shacklette, Maplewood, NJ (US)

(73) Assignee: E. I. du Ponte de Nemours and Company, Wilmington, DE (US)

( * ) Notice: Subject to any disclaimer, the term of this patent is extended or adjusted under 35 U.S.C. 154(b) by 107 days.

(21) Appl. No.: 10/160,924

(22) Filed: May 30, 2002

(65) Prior Publication Data

US 2003/0223687 A1 Dec. 4, 2003

(51) Int. Cl.[7] .................................................. G02B 6/26
(52) U.S. Cl. ............................. 385/37; 385/24; 372/20
(58) Field of Search ............................. 385/37, 24, 14, 385/16, 42; 372/20, 50, 96, 102

(56) References Cited

U.S. PATENT DOCUMENTS

| | | | |
|---|---|---|---|
| 4,807,950 A | 2/1989 | Glenn et al. .................. 385/37 |
| 5,077,816 A | 12/1991 | Glomb et al. .................. 385/37 |
| 5,493,390 A | 2/1996 | Varasi et al. .................. 356/32 |
| 5,574,807 A | 11/1996 | Snitzer .......................... 385/24 |
| 5,636,309 A | 6/1997 | Henry et al. .................. 385/129 |
| 5,818,986 A | 10/1998 | Asawa et al. .................. 385/24 |
| 5,850,498 A | 12/1998 | Shacklette et al. ........... 385/129 |
| 5,982,791 A | 11/1999 | Sorin et al. ................... 372/2.5 |
| 6,020,986 A | 2/2000 | Ball ........................... 385/37 X |
| 6,023,545 A | 2/2000 | Eldada et al. .................. 385/37 |
| 6,035,080 A | 3/2000 | Henry et al. ................... 385/24 |
| 6,069,985 A | 5/2000 | Albin et al. .................... 385/12 |
| 6,091,870 A | 7/2000 | Eldada .......................... 385/37 |
| 6,162,579 A | 12/2000 | Stengel et al. ............. 430/272.1 |
| 6,181,676 B1 | 1/2001 | Yao et al. ..................... 370/226 |
| 6,215,918 B1 | 4/2001 | Keil et al. ..................... 385/16 |
| 6,219,474 B1 | 4/2001 | Cai et al. ...................... 385/24 |
| 6,269,200 B1 | 7/2001 | Wickham et al. .............. 385/15 |
| 6,306,563 B1 | 10/2001 | Xu et al. .................. 385/122 X |
| 6,317,526 B1 | 11/2001 | Shirasaki et al. ............... 385/3 |
| 6,335,149 B1 | 1/2002 | Xu et al. .................. 385/129 X |
| 6,594,410 B2 * | 7/2003 | Kersey et al. ................. 385/15 |

* cited by examiner

Primary Examiner—Phan T. H. Palmer

(57) ABSTRACT

A wavelength selective optical device for locking to a selected wavelength in an ITU grid includes a first waveguide, a second waveguide, a heating element and a control unit. The first waveguide includes a tunable filter formed in the first waveguide and the second waveguide includes a reference filter formed in the second waveguide. The heating element is in thermal contact with the tunable filter and the reference filter and the control unit is coupled to the heating element and the reference filter. The control unit varies a temperature of the heating element responsive to an indication signal provided by the reference filter to adjust the selected channel of the tunable filter.

32 Claims, 6 Drawing Sheets

CLOSED-LOOP CONTROL OF TUNABLE OPTICAL WAVELENGTH FILTERS

BACKGROUND OF THE INVENTION

1. Field of the Invention

The present invention relates to tunable wavelength filters and, more specifically, to closed-loop control of tunable wavelength filters.

2. Technical Background

Tunable filters, e.g., fiber Bragg gratings (FBGs) have been utilized in a number of optical systems to selectively add and/or drop wavelengths (i.e., channels) at appropriate locations in wavelength division multiplexed (WDM) optical systems. As is well known to one of ordinary skill in art, a tunable FBG is a narrow band reflective element which can be tuned on or off an International Telecommunications Union (ITU) standard wavelength such that a channel may be reflected by or transmitted through the FBG. In this manner, FBGs act as selectable notch band stop filters which substantially reflect received signals within a range of wavelengths and substantially pass signals which are not within the range of wavelengths. An ideal FBG reflects one channel of a WDM signal and passes the remaining channels substantially unattenuated.

In a typical optical system, the addition or subtraction of a channel (i.e., a specific range of wavelengths) has been achieved by a controller, which controls a given FBG between one of a transmissive and a reflective state. In such a system, there has typically been a FBG for each channel of the WDM signal and the FBGs have been actuated between a transmissive and reflective state in a number of ways. For example, the period of the grating may be changed by applying a physical stress to the fiber through the use of an actuator, such as a piezo-electric device. In this manner, adjusting the power applied to the piezo-electric device, via a controller, causes the range of wavelengths reflected by an associated grating to change.

Alternatively, the effective refractive index of the fiber waveguide may be thermally tuned such that the range of wavelengths reflected by the grating varies with temperature. In this manner, the temperature of a grating is adjusted by applying an appropriate amount of power to a heater, which is typically made from an electrically resistive coating, that is in thermal contact with the grating. In such systems, each grating has typically been calibrated such that a given grating reflects a given channel at a given temperature. However, in such systems, the ability to switch a grating from one wavelength to another is limited. In the case of a glass fiber both the ability to stretch the fiber and to change its refractive index with temperature are limited. There can also be limitations to switching (tuning) speeds. In temperature controlled systems, the switching speed limitation has generally been attributable to a grating associated thermocouple, which is located near the grating to sense the grating temperature. A controller, coupled to the thermocouple, monitors the temperature reported by the thermocouple and adjusts the power delivered to an associated heater, accordingly. However, the temperature reported by the thermocouple typically differs, at least after an initial change, from the temperature of the heater. As such, the controller may overshoot or undershoot a desired heater temperature multiple times before stabilizing on a desired temperature and, thus, experience difficulty in locking onto a desired channel.

There exists a need, therefore, for a practical closed-loop control system that is capable of maintaining a tunable wavelength filter locked to a desired wavelength. It would also be desirable for such a system to be able to switch the tunable wavelength filter from one channel to another channel in a reliable relatively efficient manner, covering a wide range of wavelengths and performing the wavelength shift in an acceptably short period of time.

SUMMARY OF THE INVENTION

The present invention is directed to a wavelength selective optical device for locking to a selected channel in an ITU grid. The wavelength selective optical device includes a first grating, a second grating, one or more heating elements and a control unit.

The first grating comprises a tunable filter that reflects a selected channel from a received wavelength division multiplexed (WDM) signal. The second grating comprises a reference filter that receives a reference signal and provides an indication signal. The heating element is in thermal contact with the tunable filter and the reference filter and the control unit is coupled to the heating element(s) and the reference filter. The control unit varies a temperature of the heating element(s) responsive to the indication signal provided by the reference filter to adjust the selected channel of the tunable filter.

The first and second gratings may be independent gratings formed in a bulk material, in a planar one-dimensional or two-dimensional waveguide or in a fiber. The materials of construction may be any suitable optically transmissive material including silica, doped glasses and polymers.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENT

Figure 1:
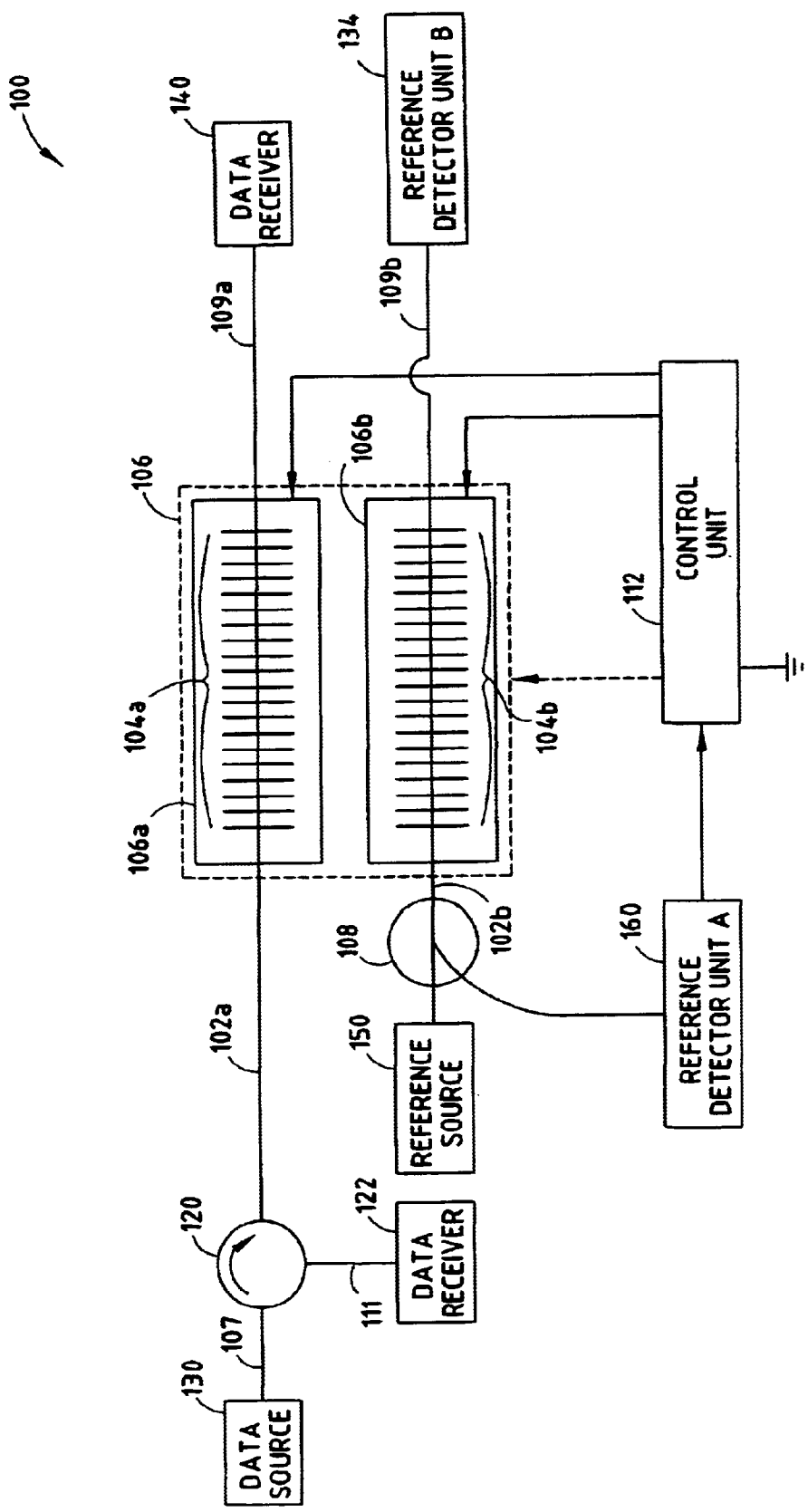
FIG. 1 is an exemplary schematic of an optical system that includes a planar waveguide with a thermally tuned grating, and an associated waveguide with a tunable reference grating.

The present invention is directed to wavelength selective optical devices for locking to selected wavelengths in an International Telecommunications Union (ITU) grid that take the form of Bragg gratings formed in a layer of bulk material, in a waveguide on a substrate or in a fiber. In one embodiment, a wavelength selective optical device includes a first grating, a second grating, one or more heating elements and a control unit. The first grating comprises a tunable filter that reflects a selected channel from a received wavelength division multiplexed (WDM) signal. The second grating comprises a reference filter that receives a reference signal and provides an indication signal. The heating element is in thermal contact with the tunable filter and the reference filter and the control unit is coupled to the heating element and the reference filter. The heating element is formed in a conventional manner, e.g., an electrically resistive coating is deposited onto an appropriate portion of a waveguide. The control unit varies a temperature of the heating element responsive to the indication signal provided by the reference filter to adjust the selected channel of the tunable filter. This allows the system to lock onto a selected channel and can be utilized in a channel selectable configuration.

As used herein the term "control unit" may include, for example, a microcontroller, a microprocessor with associated memory and peripherals, a field programmable gate array (FPGA), a programmable logic array (PLA) or a switching array. As is also used herein, the term "tunable filter" may take a wide variety of forms, e.g., a tunable Bragg grating. It should be appreciated that the systems disclosed herein can be readily modified to add signals delivered to an optical data receiver by coupling two ports of an add circulator between an output of a main waveguide and a data receiver, with the remaining port of the add circulator receiving an add signal from an add data source, and in this form function as an add/drop multiplexer (ADM).

The first and second gratings may be independent gratings formed in a bulk material, in a planar one-dimensional or two-dimensional waveguide or in a fiber. The materials of construction may be any suitable optically transmissive material including silica, doped glasses and polymers. As used herein, the term "bulk material" refers to material configuration which does not include a waveguiding means, and which is generally thick in comparison to the dimensions of a typical single-mode waveguide (thickness>>10 microns). Such a bulk material may, for example, include a thick polymer layer on a substrate or a thick slab of glass. Generally preferred thicknesses lie in a range from about 300 microns to 1000 microns. Also, as used herein, a two-dimensional waveguide (also known as a slab waveguide) generally comprises a multilayer configuration on a substrate wherein the bottom most layer (often called a buffer or lower cladding) has a low refractive index in comparison to the layer above, and the middle or top layer, which guides light in a two-dimensional plane, (often called a core layer) has an index of refraction higher than that of the lower buffer or cladding layer. The top most layer may comprise a third material of lower refractive index than the core layer or air.

Also, as used herein, the term "one-dimensional waveguide" refers to a waveguide in which light is confined to propagate in one dimension. Such a waveguide is defined by a top, a bottom and sides. Typical examples of such waveguides are channel and rib waveguides. From this point forward, the term "slab waveguide" will refer to two-dimensional waveguides and the term "planar waveguide" will refer to one-dimensional waveguides. A particularly preferred form of a planar waveguide is the buried channel waveguide.

A preferred form of the buried channel waveguide comprises a single-mode optical waveguide fabricated on a substrate, which defines a surface with a buffer layer disposed on the surface of the substrate. The buffer layer defines a surface and has an index of refraction $n_b$. A thin undercladding layer is on the surface of the buffer layer, with the undercladding layer defining a surface and having an index of refraction layer $n_u$. A light-transmissive single-mode core is on the surface of the undercladding layer and the core defines a top surface and sidewalls and has an index of refraction $n_c$. An overcladding layer is on the top surface of the core and on the sidewalls of the core and on a portion of the undercladding layer and has an index of refraction $n_o$. The core index of refraction $n_c$ is greater than the index of refraction of the overcladding layer $n_o$ and also greater than the index of refraction of the undercladding layer $n_u$. In the waveguide, $\Delta n = n_c - n_o$ and typically $n_u \approx n_o$, and the difference between $n_c$ and the index of refraction of the buffer $n_b$ is at least about 1.5 times $\Delta n$, and the value of $\Delta n$, in combination with the dimensions of the core, are such that they produce a single-mode waveguide at optical communication wavelengths.

Materials of construction may be any suitable optically transmissive material including silica, doped glasses and polymers. Polymers are particularly useful in the practice of this invention because such materials form a basis for highly tunable Bragg gratings, which can cover substantial portions of the standard communication bands. Preferred polymers are those which are photoreactive, such as those described in U.S. Pat. No. 6,306,563, which is hereby incorporated herein by reference in its entirety.

FIG. 1 depicts an exemplary optical system 100 that includes a planar waveguide 102a that includes a grating 104a, formed in the waveguide 102a, in a conventional manner. Adjacent to the grating 104a is reference grating 104b. The grating 104b may be substantially the same or different from grating 104a and may consist of a single grating or many shorter gratings in series. The gratings 104a and 104b can be fabricated in sequence, but in the most preferred method, they are fabricated simultaneously using, for example, a single phase mask. Preferably, the two gratings are parallel and in a directly opposite or side-by-side position with respect to each other. The distance between the main grating 104a and the reference grating 104b or between the waveguides 102a and 102b (or 109a and 109b) must be sufficiently large to prevent the coupling of light from one grating or waveguide to the adjacent one, but in close enough proximity to maintain a nearly identical thermal environment. Preferably, the crosstalk between waveguides or gratings is below −40 dB. The distance between waveguides or between the center of two gratings preferably lies in a range from about 20 to about 1000 microns, more preferably from about 30 to about 300 microns, and most preferably from about 50 to about 100 microns.

The reference grating is connected via a waveguide 102b to a reference source 150. The reference source may optionally be a broadband or narrow-band source. Reflected light is sent to a reference unit by the use of a coupling means 108. The coupling means may be of a variety of types such as a Y-branch, a directional coupler or a circulator. The reference units A and B, 160 and 134, respectively, may include a photodetector and optionally a filter or other elements to provide the ability to discriminate wavelength or suppress background noise. A control unit 112 monitors signals reflected or transmitted by the grating 104b to determine whether an appropriate channel is being dropped. The waveguides 102a, 102b, 109a and 109b may be made of, for example, a polymer and the gratings 104a and 104b may be, for example, tunable Bragg gratings. If waveguides are not used, the Bragg gratings 104a and 104b may be formed in a bulk material such as a photosensitive polymer or glass. The waveguides 102a and 102b may be replaced by collimating optics such as GRIN lenses or Edison lenses attached to fiber ends. In this case, the center-to-center distance between gratings is preferably between about 300 microns and 1000 microns. The coupler 108 is not necessary and could be replaced by two lensed fibers oriented at slightly different angles (an angular difference of about 0.1 to about 3 degrees).

A heating element 106 is in thermal contact with the grating 104 and is coupled to and temperature controlled by the control unit 112, which varies the temperature of the heating element 106 by changing the power delivered to the heating element 106. Optionally, the heating element 106 may be composed of two separate elements 106a and 106b, which can be separately controlled by the control unit 112. An optical data source 130 transmits a wavelength division multiplexed (WDM) signal to a first port of a three-port circulator 120, via a waveguide 107. A second port of the circulator 120 is coupled to an input of the waveguide 102a and an output of the waveguide 102a is coupled to an optical data receiver 140, via a waveguide 109a. This path, through grating 104a, represents the main through channel of the device, which carries the wavelength-multiplexed data stream. Reflection of a specific wavelength from grating 104a allows a single wavelength carrier (or channel) to be dropped from the data stream and diverted to receiver 122. This channel reflected by the grating 104a is provided to the second port of the circulator 120 and is routed by the circulator 120 to a third port (i.e., a drop port) of the circulator 120, which is coupled to an optical data receiver 122, via a waveguide 111.

The proper functioning of the device requires that the grating 104a be precisely tuned to the wavelength of the channel to be dropped. It is further desired to tune the grating to any one of a number of ITU wavelengths within a band of such wavelengths. At the same time, it is highly desirable to limit any perturbation of the data traffic in the main path, hence the present invention employs a second grating to provide the information necessary to determine to which wavelength the device is locked and to maintain this lock over time. The center wavelength of the characteristic refection from a Bragg grating is a function of the period of the grating, $\Lambda$, and the effective index of refraction, $n_{eff}$, of the medium of the grating and the waveguide, if present. The relation is given by the expression, $\lambda_B = 2n_{eff}\Lambda$. The values of both $n_{eff}$ and $\Lambda$ are functions of temperature and mechanical strain and either or both of these influences can be used to tune the grating over a range of wavelengths. The concept of the invention is based on maintaining either a nearly identical thermal and strain profile for both gratings 104a and 104b or two thermal and strain profiles with precisely known difference.

In one representative example, the waveguides and the gratings may be formed in a polymer material bonded to a rigid low CTE (coefficient of thermal expansion) substrate. In this instance, strain will be kept relatively constant and the device will be tuned by the influence of temperature changes on the effective index of the polymer waveguide in the region of the grating. By controlling the temperature of the heaters 106a and 106b, the control unit 112 can control the effective index in the region of the two gratings 104a and 104b, and hence control the difference in reflected wavelength for the two gratings. The reference source 150, the reference detectors 134 and 160, the reference grating 104b and the control unit 112 together form a sensing unit that is capable of indirectly measuring and controlling the wavelength to which the main grating 104a is tuned. Generally, reference detector units 160 and 134 will not be present simultaneously. Typically, the detector unit 134 will seek a minimum in the reference signal, where the detector unit 160 will seek a maximum in the reflected reference signal. When the reference source 150 emits a broadband of wavelengths, the detector units 134 and 160 are required to discriminate wavelengths. In some embodiments, the reference source can be part of the data stream itself, which may be accessed by placing a tap in the waveguide 102a. This scheme is less preferred since the data stream can vary in unpredictable fashion and the tap represents an unwanted perturbation of the data stream. The outputs of the detector units 134 and 160 are part of the feedback loop used by the control unit 112 to regulate the temperature of both gratings 104a and 104b. The control unit 112 applies an appropriate signal to the heating element 106 (or 106a and 106b) responsive to the output of one of the detectors 134 and 160. That is, based upon the output of the detector 160 or 134, the control unit 112 maintains the temperature of the heating element 106 (or heating elements 106a and 106b) or increases or decreases power to the heating element 106 to modify the temperature and, as such, maintain or change the channel reflected by the grating 104a. The control unit 112 can control on a peak, a dip or an edge of the detected signal as is known in the art. Exemplary of an advantage of this invention is that a control unit is generally required to slew its output to maintain a lock within a feedback loop. This slew will create a small temperature oscillation. When two heaters 106a and 106b are employed in this invention, this temperature oscillation can be restricted to the reference grating 104b, and an integrated and smoothed control signal can be fed to heater 106a.

Figure 2:
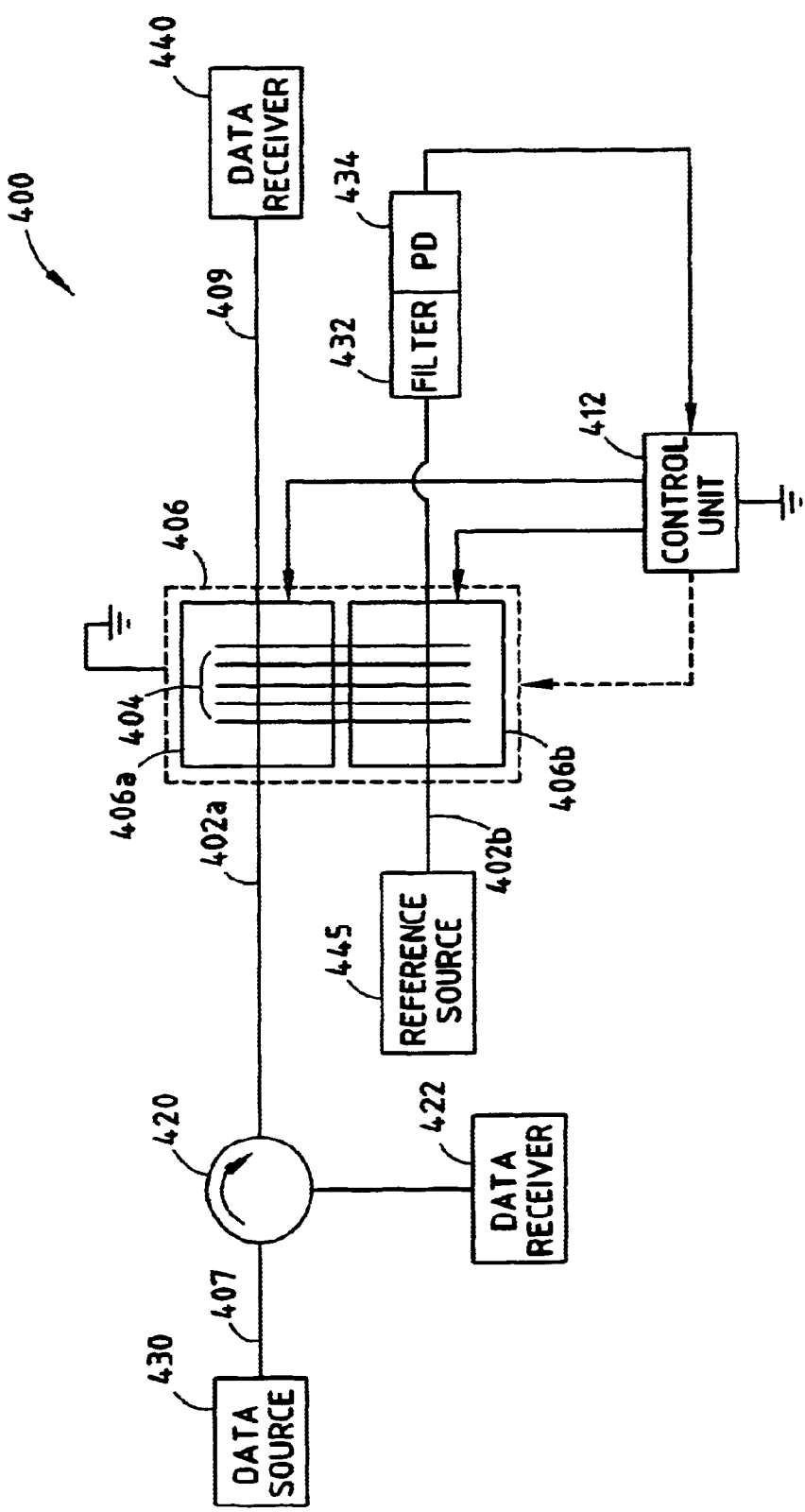
FIG. 2 is an exemplary schematic of an optical system that includes a pair of planar waveguides with thermally tuned gratings, according to an embodiment of the present invention.

FIG. 2 depicts an exemplary optical system 400 that includes a pair of planar waveguides, i.e., a main waveguide 402a and a reference waveguide 402b, with a grating 404 simultaneously formed in and across the waveguides 402a and 402b, according to an embodiment of the present invention. A heating element 406b controls the temperature of the portion of the grating 404 across the reference waveguide 402b and a heating element 406b controls the temperature of the portion of the grating 404 across the main waveguide 402a. Alternatively, but less preferred in this example, a single heating element 406 may be utilized to heat the grating 404 across both of the waveguides 402a and 402b.

A data source 430, which provides a WDM signal, is coupled to a first port of a circulator 420, via a waveguide 407, and a second port of the circulator 420 is coupled to an input of the main waveguide 402a. An output of the main waveguide 402a is coupled, via a waveguide 409, to an input of an optical data receiver 440. An output of a reference source 445 is coupled, by waveguide 402b, through the lower portion of the grating 404 to an optional interference filter 432, whose output is optically coupled to an input of a photodetector 434. When the reference source 445 is broadband, as with an LED, the filter 432 is required, but when the reference source employed is characterized by a sharp wavelength distribution, as with the reflection from a temperature-compensated fiber Bragg grating, then the filter 432 is not required. In some instances, it may be preferred to track the reference source 445 in reflection rather than transmission. An output of the photodetector 434 is coupled to an input of the control unit 412, which includes outputs coupled to the heating elements 406a and 406b, which individually control the temperatures of the heating elements 406a and 406b responsive to a signal received from the photodetector 434. As mentioned above, the heating elements 406a and 406b may be combined in a single heater 406, whose temperature is controlled by a single output of the control unit 412.

In operation, the control unit 412 monitors the output of the photodetector 434 to determine whether to maintain, increase or decrease the power supplied to the heating element 406b such that the reference grating portion of the grating 404 remains tuned to the reference wavelength of the filter 432 or to the reference wavelength provided by a narrow-band reference source. If the system 400 begins to drift from the reference wavelength, the output of the photodetector 434 changes. In this case, the control unit 412 varies the power delivered to the heating element 406b such that the output of the photodetector 434 is maintained at a minimum. The control unit 412 is also programmed to provide a voltage (or power) to the heating element 406a of the main waveguide 402a that corresponds to a calibrated voltage (or power) difference between the reference wavelength and a desired ITU wavelength that is to be dropped to the data receiver 422, via a third port of the circulator 420. In this embodiment, the reference channel serves to provide a steady baseline for the voltage (or power) to be provided to the main heating element 406a. This baseline will be held approximately constant against variation of ambient temperature and changes in the thermal contact between the device and any thermal heat sink to which it may be attached.

Figure 3A:
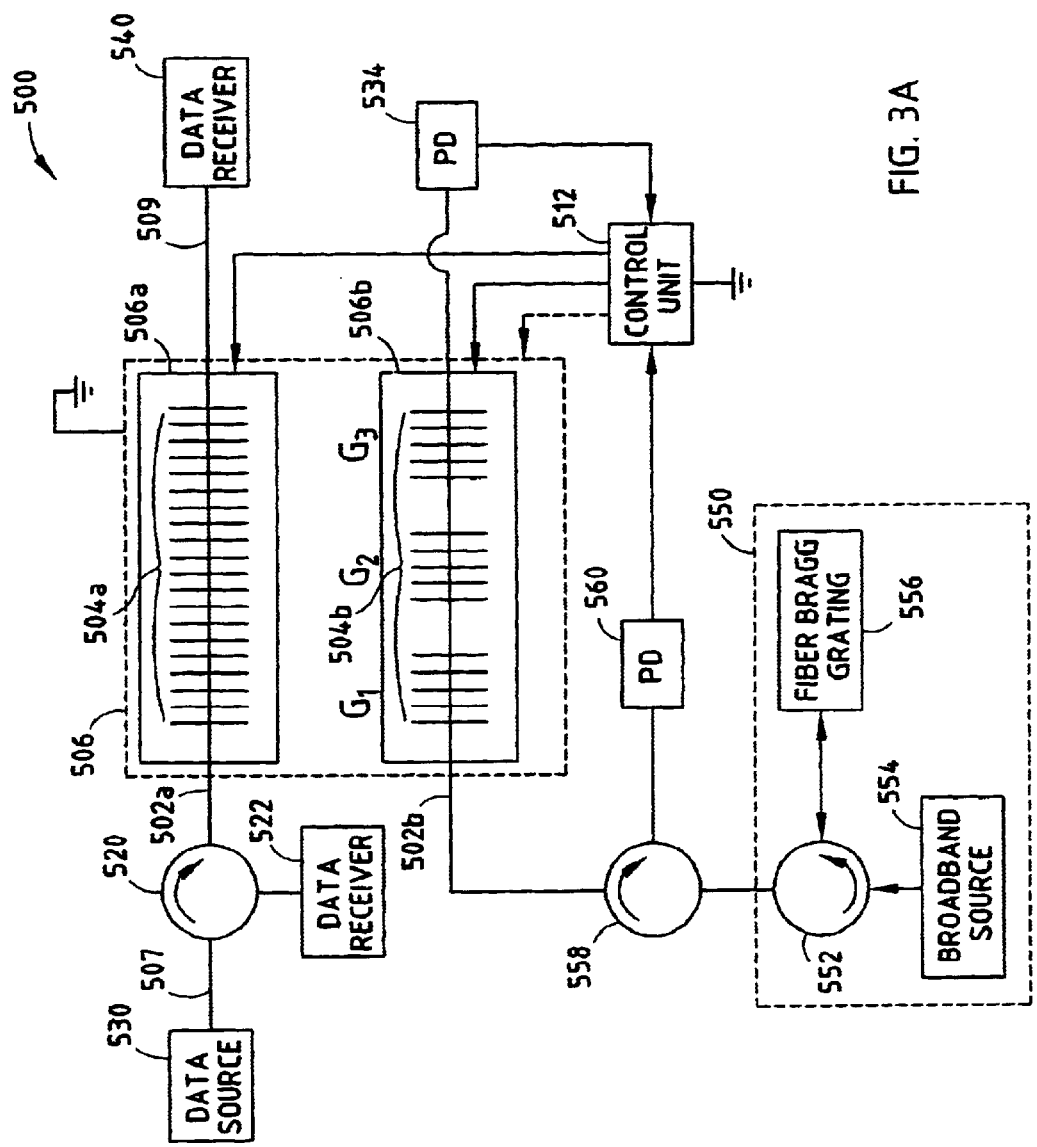
FIG. 3A is an exemplary schematic of an optical system that includes a pair of planar waveguides with a main waveguide including a thermally tuned grating and a reference waveguide with a plurality of serially coupled step gratings each with a different period, according to one embodiment of the present invention.

FIG. 3A depicts an optical system 500 with a main waveguide 502a that includes a grating (e.g., a tunable Bragg grating) 504a and a reference waveguide 502b that includes a series of short gratings (i.e., gratings $G_1$, $G_2$ and $G_3$) 504b with different periods $\Lambda_1$, $\Lambda_2$ and $\Lambda_3$, respectively. A reference signal is provided to an input of the waveguide 502b by a reference signal source 550, which may include a broadband signal source 554 (e.g., a light emitting diode (LED)), a circulator 552 and a thermally compensated fiber Bragg grating 556. An output of the source 554 is coupled to a first port of the circulator 552 and a second port of the circulator 552 is coupled to the thermally compensated fiber Bragg grating 556, which ideally reflects a single reference wavelength back to the second port of the circulator 552. The circulator 552 provides the reference wavelength at its third port, which is coupled to the input of the reference waveguide 502b, via first and second ports of a circulator 558.

As is shown in FIG. 3A, a control unit 512 is coupled to a heating element 506a and 506b. Alternatively, the heating elements 506a and 506b may be combined to form a single heating element 506. To reflect a desired channel to optical data receiver 522, which is coupled to a third port of circulator 520, the control unit 512 supplies power to the heating elements 506a and 506b or 506 to cause the effective refractive index ($n_{eff}$) of the waveguide 502a to change to an appropriate value such that a desired ITU wavelength is reflected. With reference to the grating 504b, as the power is increased to the heating element 506b, the effective refractive index of the waveguide 502b changes until a grating $G_1$ reflects the reference signal provided by the source 550. Since the period of grating $G_1$ is known and the wavelength of the reference signal is known, the effective refractive index of the waveguide 502a, assuming the refractive index of the waveguides 502a and 502b are the same, can be determined. With a further increase of temperature, the effective refractive index of the waveguide 502b changes such that the grating $G_1$ no longer reflects the reference signal, which as a result allows the reference signal to proceed to a second grating $G_2$, which acts to reflect the reference signal. Due to the increased travel distance of the reference signal, the amount of reflected light decreases. Likewise, as the temperature of the waveguide 502b continues to increase the grating $G_2$ no longer reflects the reference signal and it is passed to and reflected by the grating $G_3$. While only three gratings are illustrated, it should be appreciated that more or less gratings may be utilized depending upon the application.

Figure 3B:
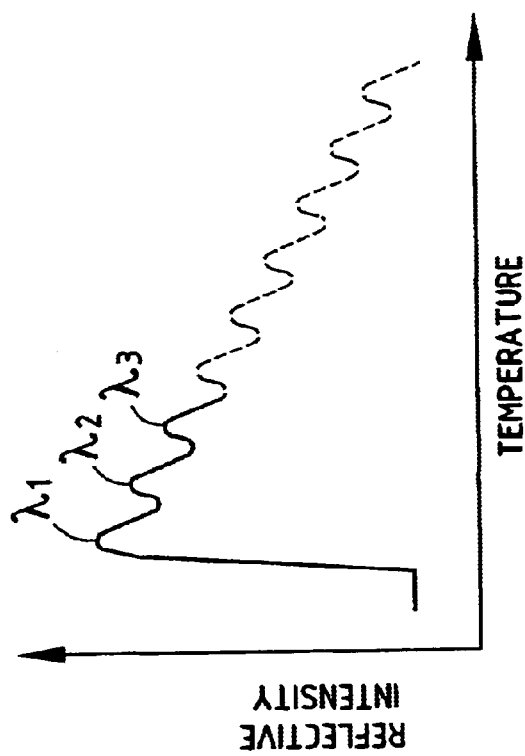
FIGS. 3B–3C are graphs of reflection intensity and transmission intensity as a function of temperature, respectively, of a reference signal associated with the reference waveguide of FIG. 3A.
Figure 3C:
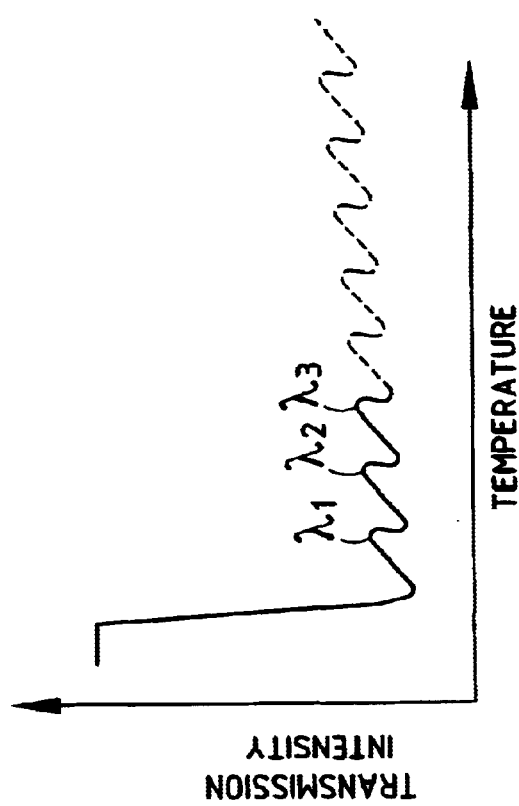

In this manner, the step like loss in the reflected signal strength provides an indication of when the effective index of the reference waveguide 502b has transitioned from a value suited to reflecting one ITU wavelength to a value suited to another ITU wavelength. FIG. 3B graphs the reflection intensity associated with the reference signal as reflected from the waveguide 502b, as a function of increasing heating element temperature. The transmission intensity of the reference signal as it has passed through the waveguide 502b, as a function of increasing heating element temperature, is illustrated in FIG. 3C. When two heaters are used, the control unit will drive the heater 504a with a voltage (or power) level substantially the same as that used for heater 504b, but allowing for small calibration differences. The effective index under the main grating and the series of reference gratings will then be substantially the same. For this condition, the wavelength reflected from the main grating will be solely a function of the period of the main grating ($\Lambda$) and the period of the $m^{th}$ reference grating ($\Lambda_m$), when the reflected reference signal is at a maximum or the transmitted reference signal is at a minimum due to reflection from the $m_{th}$ reference grating. The value of the period of the $m^{th}$ reference grating is chosen so that the value of the $m^{th}$ ITU wavelength is given by $\lambda_{ITU}^{(m)} = \lambda_o \Lambda / \Lambda_m$, where $\lambda_o$ is the center wavelength of the filter passband or the narrow-band reference source.

Figure 4:
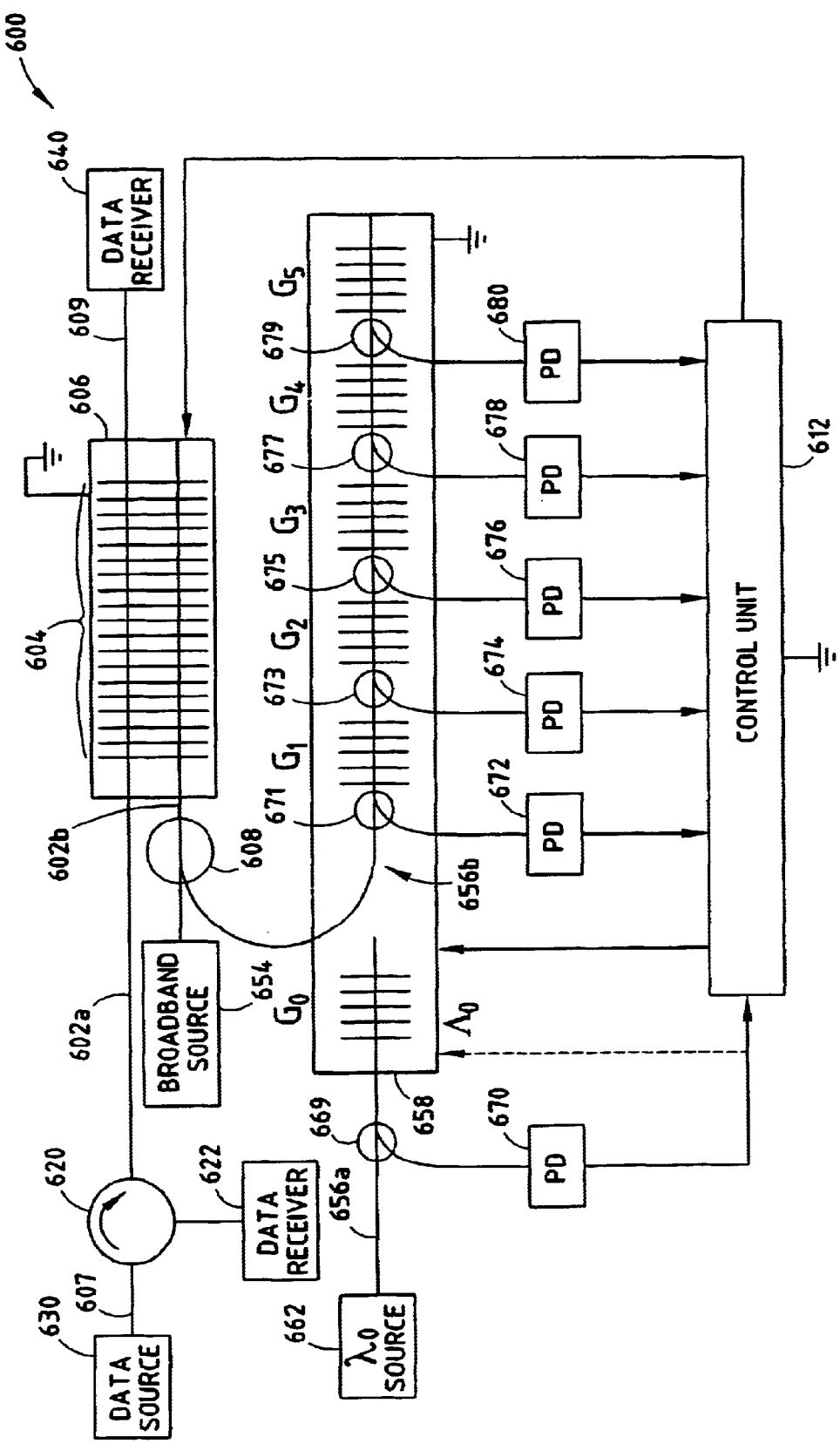
FIG. 4 is an exemplary schematic of an optical system that includes a pair of planar waveguides with a thermally tuned grating and a monitor waveguide with a reference grating having a plurality of serially coupled step gratings each with a different period, according to another embodiment of the present invention.

FIG. 4 depicts an exemplary optical system 600 that includes a main waveguide 602a and a reference waveguide 602b that includes a grating 604 having a period, $\Lambda$, formed in and across the waveguides 602a and 602b. A heating element 606, which is in thermal contact with the grating 604, is controlled by a control unit 612 responsive to outputs from a plurality of photodetectors 672, 674, 676, 678 and 680. An optical data source 630 transmits a WDM signal and is coupled to a first port of a circulator 620, via a waveguide 607, with a second port of the circulator 620 being coupled to an input of the waveguide 602a. A third port (i.e., a drop port) of the circulator 620 is coupled to an optical data receiver 622, which receives a channel that is dropped. An optical data receiver 640 is optically coupled to an output of the waveguide 602a, via a waveguide 609. A broadband data source 654 provides a broadband signal to an input of the reference waveguide 602b and the portion of the gratings 604 associated with the waveguide 602b may reflect a portion of the broadband signal depending upon the temperature of the heating element 606.

A second waveguide 656a receives a signal from a reference source 662, via a directional coupler 669. A signal reflected from a grating $G_0$, with a period $\Lambda_0$, of the waveguide 656a is provided to an input of a photodetector 670 and an output of the photodetector 670 is coupled to an input of a control unit 612. Responsive to the output of the photodetector 670, the control unit 612 controls the temperature of the heating element 658 to maintain the signal reflected from the grating $G_0$ at a maximum. Alternatively, the output from the photodetector 670 may be utilized to directly control the temperature of the heating element 658.

A directional coupler 608 provides a signal reflected from the portion of the grating 604, associated with the reference waveguide 602b, to a waveguide 656b, which includes a plurality of gratings $G_1$, $G_2$, $G_3$, $G_4$ and $G_5$, with periods $\Lambda_1$, $\Lambda_2$, $\Lambda_3$, $\Lambda_4$ and $\Lambda_5$, respectively, that share a common thermal environment with the waveguide 656a, via a directional coupler 671. The coupler 671 provides a signal reflected off of the grating $G_1$ to an input of a photodetector 672, whose output is coupled to a second input of the control unit 612. The directional coupler 673 receives a signal transmitted through the grating $G_1$ and provides a signal reflected from the grating $G_2$ to an input of a photodetector 674, whose output is coupled to a third input of the control unit 612. An input of the directional coupler 675 receives an input signal transmitted through the grating $G_2$ and provides the transmitted signal to the input of the grating $G_3$.

The directional coupler 675 receives a reflected signal from the grating $G_3$ and provides the reflected signal to an input of a photodetector 676, whose output is coupled to a fourth input of the control unit 612. An input of the directional coupler 677 receives an input signal transmitted through the grating $G_3$ and provides the transmitted signal to the input of grating $G_4$. The directional coupler 677 receives a reflected signal from the grating $G_4$ and provides the reflected signal to an input of a photodetector 678, whose output is coupled to a fifth input of the control unit 612. A directional coupler 679, coupled between the gratings $G_4$ and grating $G_5$ provides a signal transmitted through the grating $G_4$ to the grating $G_5$ and provides a signal reflected from the grating $G_5$ to an input of a photodetector 680, whose output is coupled to a sixth input of the control unit 612. Based upon the outputs from the photodetectors 672–680, the control unit 612 controls the heating element 606 such that the portion of the grating 604 in the main waveguide 602a reflects a selected ITU wavelength and locks onto the ITU selected wavelength.

The waveguides 656a and 656b, in conjunction with the gratings $G_0$ and $G_1$–$G_5$ form a demultiplexer that is calibrated either by directly providing an output of the photodetector 670 to the heating element 658 or by providing the output of the photodetector 670 to an input of the control unit 612, which, in turn, controls the power supplied to the heating element 658. The device 600 in FIG. 4 provides a specific example of the scheme depicted in FIG. 1, wherein the demultiplexer components taken together provide an example of a wavelength selective detection means as included in the range of performance characteristics for reference detector unit 160. The portion of this detector unit composed of the waveguides 656a and 656b, the couplers 669 through 679 and the gratings $G_0$ through $G_5$ can be integrated on the same substrate with the grating 604 or they can be on a separate substrate (or chip). If the two portions of the device, main grating 604 and demultiplexer are integrated on the same substrate, they can be maintained at different temperatures by providing heaters on the top of the waveguides and gratings. If the two portions of the device are on separate substrates then either heaters (or coolers) connected to the substrates or heaters on top of the gratings can be used.

The effective refractive index of the waveguide 656a, which is in thermal contact with the heating element 658, is maintained at a value given by:

$n_0 = \lambda_0 / 2\Lambda_0$ by maximizing the reflection of the wavelength, $\lambda_0$, from the grating $G_0$. The other gratings $G_1$ through $G_5$ may be chosen to produce reflections at successive ITU wavelengths, according to the formula set forth below:

$\Delta\lambda_{ITU} = 2n_0(\Lambda_{n+1} - \Lambda_n)$ where the n$^{th}$ ITU wavelength can be represented by $\lambda_{ITU}{}^{(n)} = 2n_0 \Lambda_n = \lambda_0 \Lambda_n / \Lambda_0$. Thus, the control unit 612 is configured to change the temperature of the heating element 606 until the output of the photodetectors 672–680 meets a desired condition. It should be appreciated that the digital word encoded at the outputs of the photodetectors 672–680 can be decoded into a wavelength or frequency to be displayed and can also be used to program, for example, an electronic switch to select a particular output to provide a control signal for the heating element 606. Since the device 600 employs simple directional couplers a portion of the reflected light will appear at all the photodetectors which precede that grating along the waveguide 656b. Thus, for example, the digital word corresponding to the 2$^{nd}$ ITU wavelength reflected from grating G2 would be 11000, or the 3$^{rd}$ ITU wavelength would be 11100, and so on. It should also be appreciated that any number of gratings can be implemented within the waveguide 656b.

Figure 5:
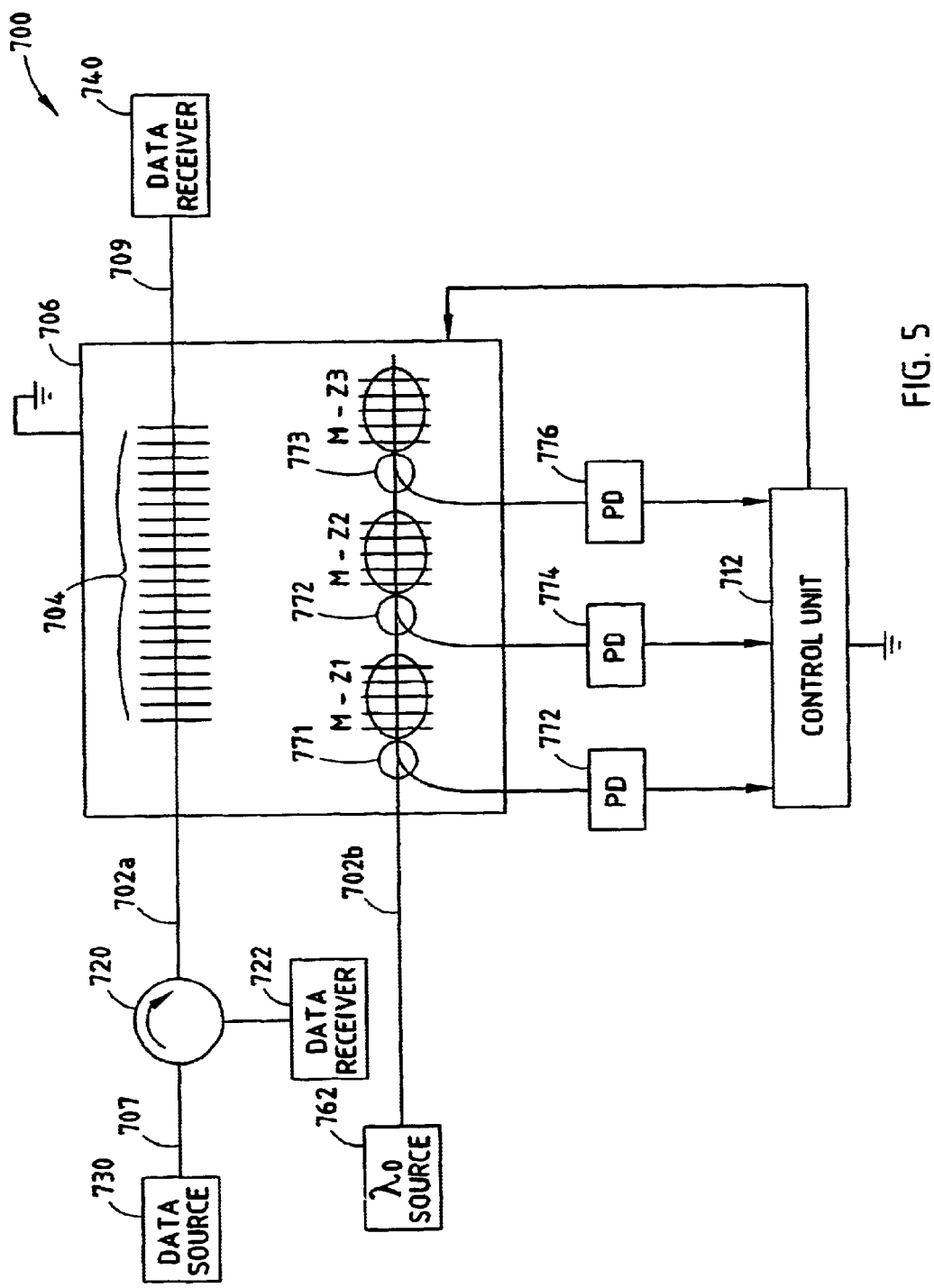
FIG. 5 is an exemplary schematic of an optical system that includes a pair of planar waveguides with a main waveguide including a thermally tuned grating and a reference waveguide with a plurality of serially coupled step gratings each with a different period formed across arms of a Mach-Zehnder interferometer, according to yet another embodiment of the present invention.

FIG. 5 depicts an optical system 700 that includes a waveguide 702a that has a grating 704 and a reference waveguide 702b that has a plurality of Mach-Zehnder interferometers M-Z1, M-Z2 and M-Z3. As is shown in FIG. 5, a Mach-Zehnder filter M-Z1 include gratings $G_1$ across both arms with a period of $\Lambda_1$, a Mach-Zehnder filter M-Z2 includes grating $G_2$ across both arms with a period $\Lambda_2$ and a Mach-Zehnder filter M-Z3 includes grating $G_3$ across both arms with a period of $\Lambda_3$. It should be appreciated that more or less Mach-Zehnder filters may be implemented, as desired. A circulator 720 is coupled between an output of an optical data source 730 and an input of the waveguide 702a. WDM signals provided by the data source 730, via a waveguide 707, to a first port of the circulator 720 are passed, via a second port of the circulator 720, to the input of the waveguide 702a. Signals that are reflected from the grating 704, formed in the waveguide 702a, are received at the second port of the circulator 720 and provided to an optical data receiver 722, coupled to a third port (i.e., a drop port) of the circulator 720. A common heating element 706 is in thermal contact with the grating 704 and the gratings $G_1$, $G_2$ and $G_3$ of the Mach-Zehnder filters M-Z1, M-Z2 and M-Z3. An optical data receiver 740 is coupled to an output of the waveguide 702a, via a waveguide 709, and receives signals transmitted through the grating 704. As previously discussed, signals reflected from the grating 704 are provided to the data receiver 722, via the circulator 720.

As is shown in FIG. 5, a reference source 762 provides a reference signal to the reference waveguide 702b. A directional coupler 771 is coupled between the source 762 and the first Mach-Zehnder filter M-Z1. The signals reflected from the grating of the filter M-Z1 are provided, via the coupler 771, to an input of the photodetector 772, whose output is provided to a first input of the control unit 712. An output of the filter M-Z1 is optically coupled to an input of a directional coupler 772, whose output is coupled an input of the filter M-Z2. The signals reflected from the grating of the filter M-Z2 are provided to an input of a photodetector 774, via the directional coupler 772, and an output of the photodetector 774 is coupled to a second input of the control unit 712. An output of the filter M-Z2 is coupled to an input of a directional coupler 773 whose output is coupled to an input of the filter M-Z3. The signals reflected from the filter M-Z3 are received by the directional coupler 773 and provided to an input of the photodetector 776, whose output is coupled to a third input of the control unit 712. Preferably, the directional couplers 771, 772 and 773 are 3-dB couplers, which allow reflected light to be fully dropped at the adjacent drop port. For example, all or a substantial portion of the light reflected from the grating $G_2$ of M-Z2 would be sent to detector 774, and so on.

Based upon the output signals received from the photodetectors 772, 774 and 776, the control unit 712 controls the temperature of the heating element 706 to lock onto a desired ITU wavelength. In this manner, the control unit 712 can track the wavelengths reflected by the filters M-Z1, M-Z2 and M-Z3 and selectively determine which wavelength is being reflected by the grating 704 and adjust the temperature of the heating element 706 such that a desired wavelength is locked onto and reflected from the grating 704.

The heating element 706 may be a thin-film heater applied above the gratings 704 and G1, G2 and G3 on top of the upper cladding, or it may be a heater or thermoelectric cooler (TEC) in direct contact with the substrate. Since in both instances a common temperature will be maintained for all gratings, the device produces a uniform and identical effective index of refraction for both the main data path and the reference path. The device is tuned by changing this effective index with temperature. As an example, when the control unit 712 locks onto and maximizes the output from detector 774, which sees the reflected signal from M-Z2, the effective index becomes $$n^{(2)} = \lambda_0 / 2\Lambda_2$$

The dropped wavelength received at 722 is then $$\lambda_2 = 2n^{(2)}\Lambda_2 = \lambda_0 \Lambda / \Lambda_2$$

This dropped wavelength is made equal to the desired ITU wavelength, $\lambda_{ITU}^{(2)}$, by choosing the values of $\lambda_0$, $\Lambda$ and $\Lambda_2$ appropriately.

Accordingly, a number of wavelength selective optical devices have been described which lock onto a selected wavelength in an ITU grid. The wavelength selective optical devices commonly include a first waveguide, a second waveguide, a heating element and a control unit. As is described above, the first waveguide includes a tunable filter formed in the first waveguide that reflects a selected channel from a received wavelength division multiplexed (WDM) signal and the second waveguide includes a reference filter formed in the second waveguide that receives a reference signal and provides an indication signal. The heating element or elements is (are) in thermal contact with the tunable filter and the reference filter and the control unit is coupled to the heating element and the reference filter. The control unit varies a temperature of the heating element responsive to the indication signal provided by the reference filter to adjust the selected channel of the tunable filter.

It will become apparent to those skilled in the art that various modifications to the preferred embodiment of the invention as described herein can be made without departing from the spirit or scope of the invention as defined by the appended claims.

The invention claimed is:

1. A wavelength selective optical device for locking to a selected wavelength in an ITU grid, comprising:
    a first tunable filter, the tunable filter reflecting a selected channel from a received wavelength division multiplexed (WDM) signal;
    a second tunable reference filter formed in proximity to the first tunable filter, the reference filter receiving a reference signal and providing an indication signal;
    a heating element in thermal contact with the tunable filter and the reference filter; and
    a control unit coupled to the heating element and the reference filter, wherein the control unit varies a temperature of the heating element responsive to the indication signal provided by the reference filter to adjust the selected channel of the tunable filter.

2. The device of claim 1, wherein the tunable filter is a Bragg grating.

3. The device of claim 1, wherein the tunable filter and the reference filter are Bragg gratings.

4. The device of claim 3, wherein the tunable filter is formed within a first waveguide and the reference filter is formed within a second waveguide.

5. The device of claim 4, wherein the reference source is a broadband source, and wherein the indication signal is at least a portion of a reflected signal reflected by the reference filter.

6. The device of claim 5, further including:
    a monitor waveguide including a reference grating and plurality of serially coupled step gratings each with a different period, wherein the indication signal is provided to an input of the plurality of serially coupled step gratings;
    a reference source providing another reference signal to the reference grating; and
    a second heating element in thermal contact with the reference grating and the plurality of serially coupled step gratings, wherein the second heating element is coupled to the control unit and the temperature of the second heating element is controlled by the control unit responsive to a second indication signal which is at least a portion of another reflected signal reflected by the reference grating, and wherein each of the serially coupled step gratings provides grating indication signals to the control unit that the control unit utilizes to determine the wavelength of signals reflected from the reference filter formed in the second waveguide.

7. The device of claim 1, wherein the reference signal is a portion of the received WDM signal and the indication signal is at least a portion of a transmitted signal passed by the reference filter.

8. The device of claim 1, wherein the reference signal is provided by a reference source that is independent of the received WDM signal.

9. The device of claim 8, wherein the reference filter includes a plurality of serially coupled step gratings each with a different period and the indication signal is at least a portion of a transmitted signal passed by the reference filter.

10. The device of claim 8, wherein the reference filter includes a plurality of serially coupled step gratings each with a different period and the indication signal is at least a portion of a reflected signal reflected by the reference filter.

11. The device of claim 10, wherein each of the plurality of serially coupled step gratings are formed across arms of a different Mach-Zehnder interferometer.

12. The device of claim 1, wherein the heating element includes a first heating element for varying the temperature and characteristics of the tunable filter and a second heating element for varying the temperature and characteristics of the reference filter, and wherein the first and second heating elements are separably controllable.

13. An optical system, comprising:
  a wavelength selective optical device for locking to a selected channel in an ITU grid, including:
    a first waveguide including a tunable filter formed in the first waveguide, the tunable filter reflecting a selected channel from a received wavelength division multiplexed (WDM) signal;
    a second waveguide including a reference filter formed in the second waveguide, the reference filter receiving a reference signal and providing an indication signal;
    a heating element in thermal contact with the tunable filter and the reference filter; and
    a control unit coupled to the heating element and the reference filter, wherein the control unit varies a temperature of the heating element responsive to the indication signal provided by the reference filter to adjust the selected channel of the tunable filter;
  an optical data source coupled to an input of the wavelength selective optical device, the optical data source providing the WDM signal to the input of the wavelength selective optical device; and
  an optical data receiver coupled to an output of the wavelength selective optical device for receiving at least one channel of the WDM signal transmitted by the optical data source.

14. The system of claim 13, wherein the tunable filter is a Bragg grating.

15. The system of claim 13, wherein the tunable filter and the reference filter are Bragg gratings.

16. The system of claim 13, wherein the reference signal is a portion of the received WDM signal and the indication signal is at least a portion of a transmitted signal passed by the reference filter.

17. The system of claim 13, wherein the reference signal is provided by a reference source that is independent of the received WDM signal.

18. The system of claim 17, wherein the reference filter includes a plurality of serially coupled step gratings each with a different period and the indication signal is at least a portion of a transmitted signal passed by the reference filter.

19. The system of claim 17, wherein the reference filter includes a plurality of serially coupled step gratings each with a different period and the indication signal is at least a portion of a reflected signal reflected by the reference filter.

20. The system of claim 19, wherein each of the plurality of serially coupled step gratings are formed across arms of a different Mach-Zehnder interferometer.

21. The system of claim 13, wherein the reference source is a broadband source, and wherein the indication signal is at least a portion of a reflected signal reflected by the reference filter.

22. The system of claim 21, wherein the wavelength selective optical device further includes:
  a monitor waveguide including a reference grating and plurality of serially coupled step gratings each with a different period, wherein the indication signal is provided to an input of the plurality of serially coupled step gratings;
  a reference source providing another reference signal to the reference grating; and
  a second heating element in thermal contact with the reference grating and the plurality of serially coupled step gratings, wherein the second heating element is coupled to the control unit and the temperature of the second heating element is controlled by the control unit responsive to a second indication signal which is at least a portion of another reflected signal reflected by the reference grating, and wherein each of the serially coupled step gratings provides grating indication signals to the control unit that the control unit utilizes to determine the wavelength of signals reflected from the reference filter formed in the second waveguide.

23. The system of claim 13, wherein the heating element includes a first heating element for varying the temperature and characteristics of the tunable filter and a second heating element for varying the temperature and characteristics of the reference filter, and wherein the first and second heating elements are separably controllable.

24. A wavelength selective optical device for locking to a selected wavelength in an ITU grid, comprising:
  a first waveguide including a tunable filter formed in the first waveguide, the tunable filter reflecting a selected channel from a received wavelength division multiplexed (WDM) signal;
  a second waveguide including a reference filter formed in the second waveguide, the reference filter receiving a reference signal and providing an indication signal;
  a heating element in thermal contact with the tunable filter and the reference filter; and
  a control unit coupled to the heating element and the reference filter, wherein the control unit varies a temperature of the heating element responsive to the indication signal provided by the reference filter to adjust the selected channel of the tunable filter, and wherein the tunable filter and the reference filter are Bragg gratings.

25. The device of claim 24, wherein the reference signal is a portion of the received WDM signal and the indication signal is at least a portion of a transmitted signal passed by the reference filter.

26. The device of claim 24, wherein the reference signal is provided by a reference source that is independent of the received WDM signal.

27. The device of claim 26, wherein the reference filter includes a plurality of serially coupled step gratings each with a different period and the indication signal is at least a portion of a transmitted signal passed by the reference filter.

28. The device of claim 26, wherein the reference filter includes a plurality of serially coupled step gratings each with a different period and the indication signal is at least a portion of a reflected signal reflected by the reference filter.

29. The device of claim 28, wherein each of the plurality of serially coupled step gratings are formed across arms of a different Mach-Zehnder interferometer.

30. The device of claim 24, wherein the reference source is a broadband source, and wherein the indication signal is at least a portion of a reflected signal reflected by the reference filter.

31. The device of claim 30, further including:
a monitor waveguide including a reference grating and plurality of serially coupled step gratings each with a different period, wherein the indication signal is provided to an input of the plurality of serially coupled step gratings;
a reference source providing another reference signal to the reference grating; and
a second heating element in thermal contact with the reference grating and the plurality of serially coupled step gratings, wherein the second heating element is coupled to the control unit and the temperature of the second heating element is controlled by the control unit responsive to a second indication signal which is at least a portion of another reflected signal reflected by the reference grating, and wherein each of the serially coupled step gratings provides grating indication signals to the control unit that the control unit utilizes to determine the wavelength of signals reflected from the reference filter formed in the second waveguide.

32. The device of claim 24, wherein the heating element includes a first heating element for varying the temperature and characteristics of the tunable filter and a second heating element for varying the temperature and characteristics of the reference filter, and wherein the first and second heating elements are separably controllable.

* * * * *